June 1, 1937.   C. C. KINKER   2,082,640
MACHINE FOR FORMING HOLLOW GLASS ARTICLES
Filed April 15, 1935   6 Sheets-Sheet 1
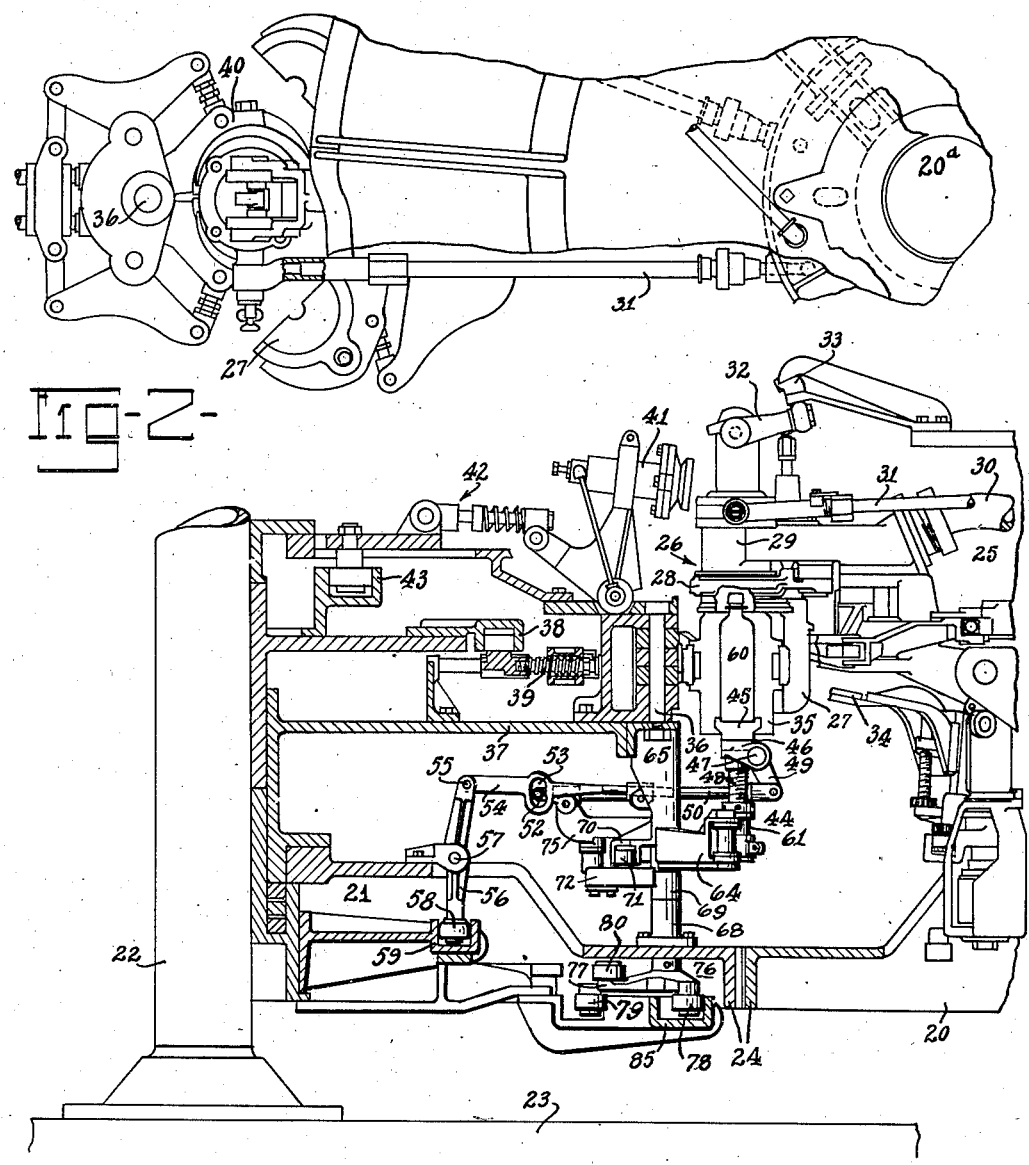
Inventor
Clarence C. Kinker
By J. F. Rule,
Attorney

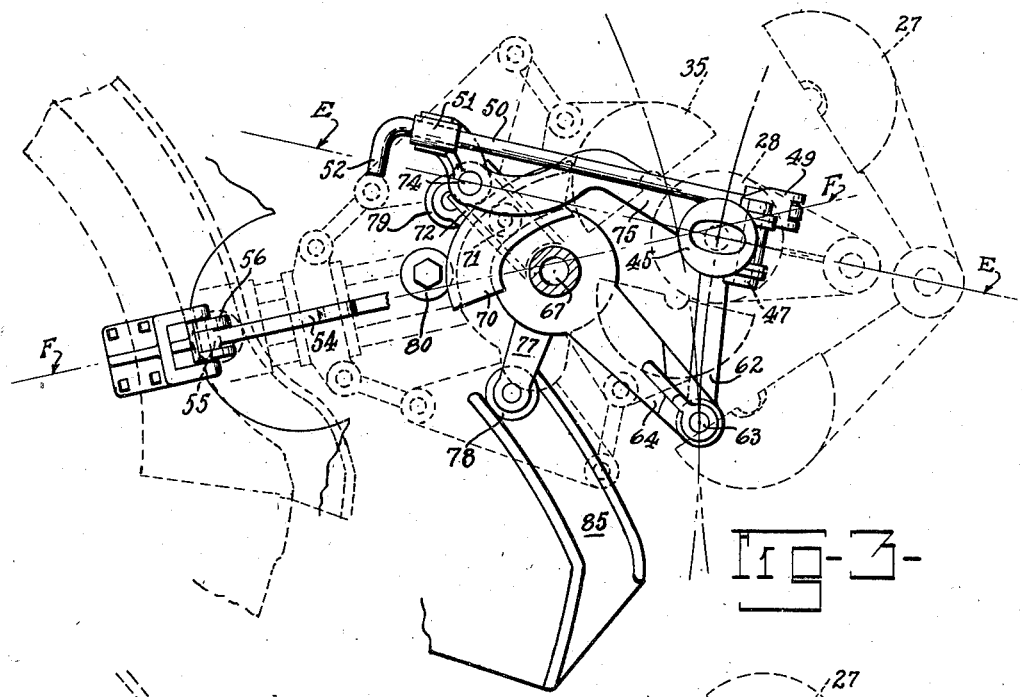
Fig-3-
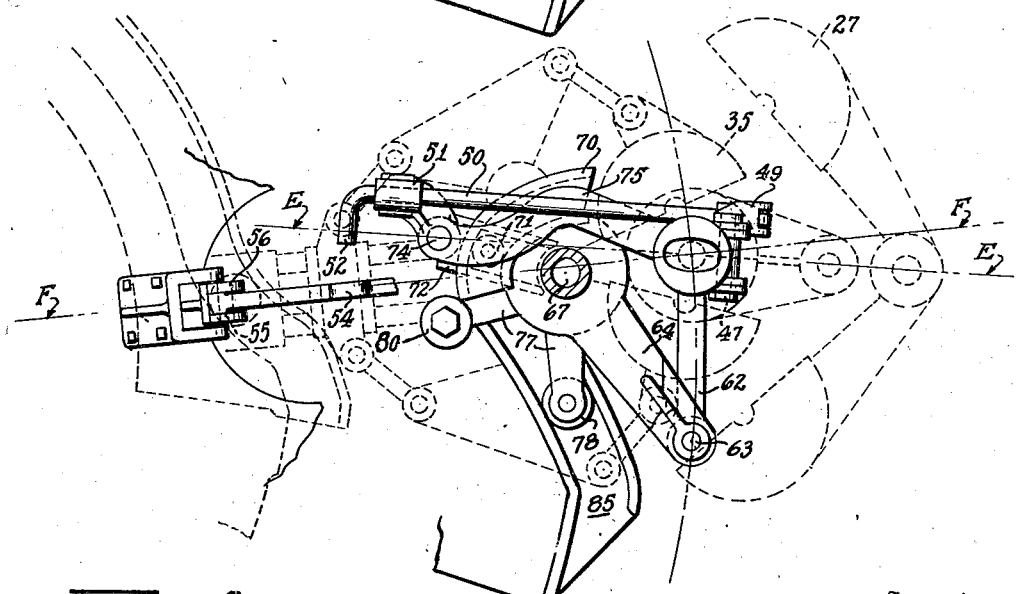
Fig-4-

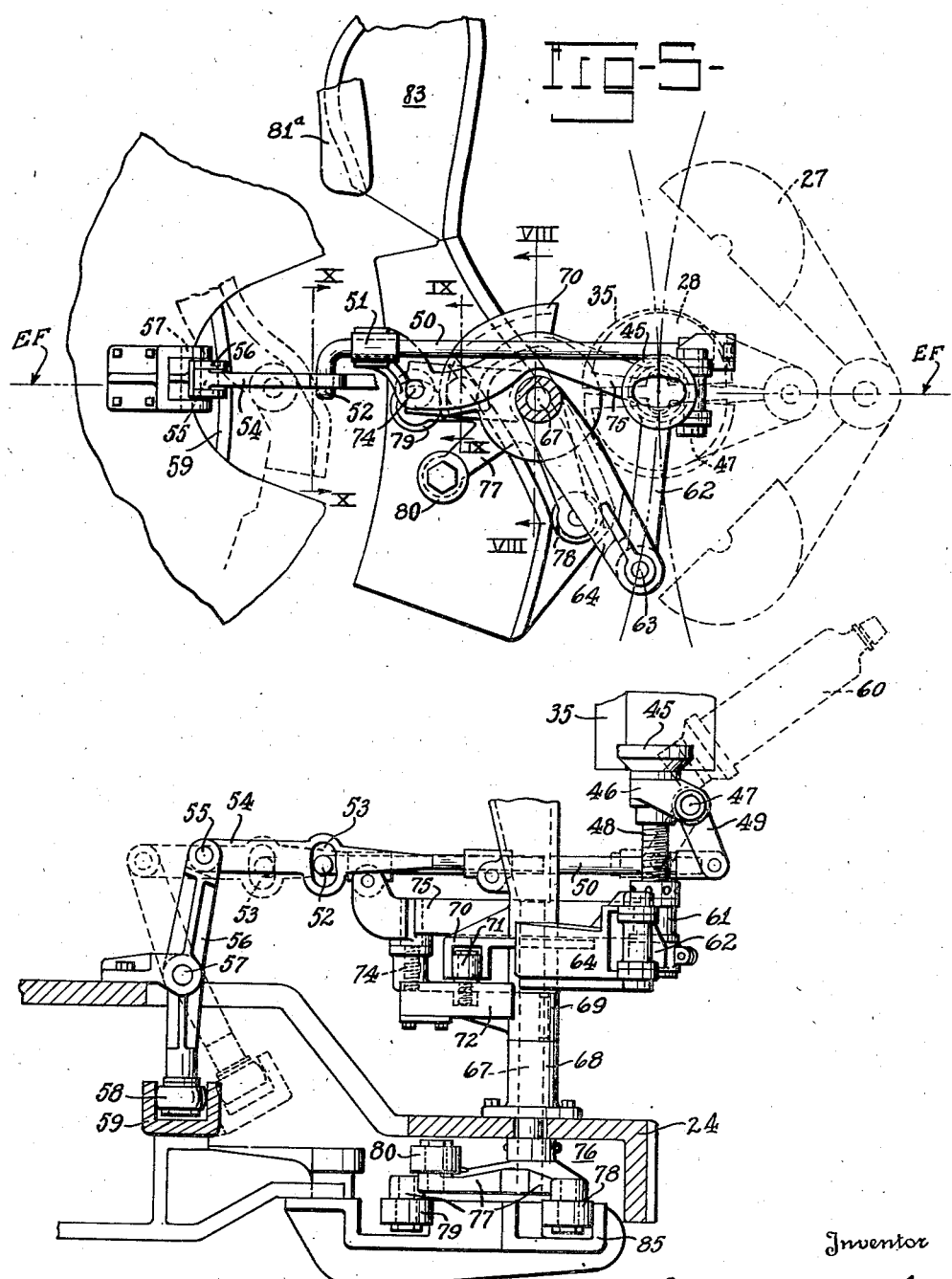

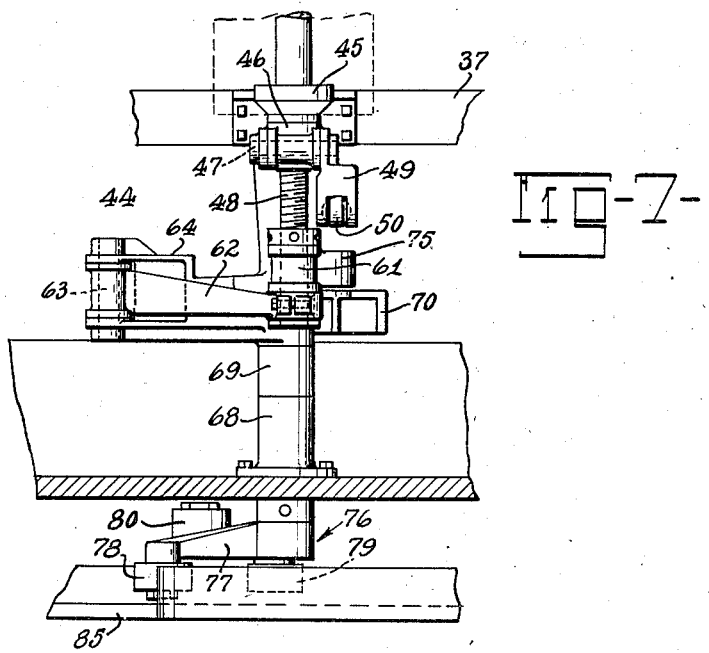
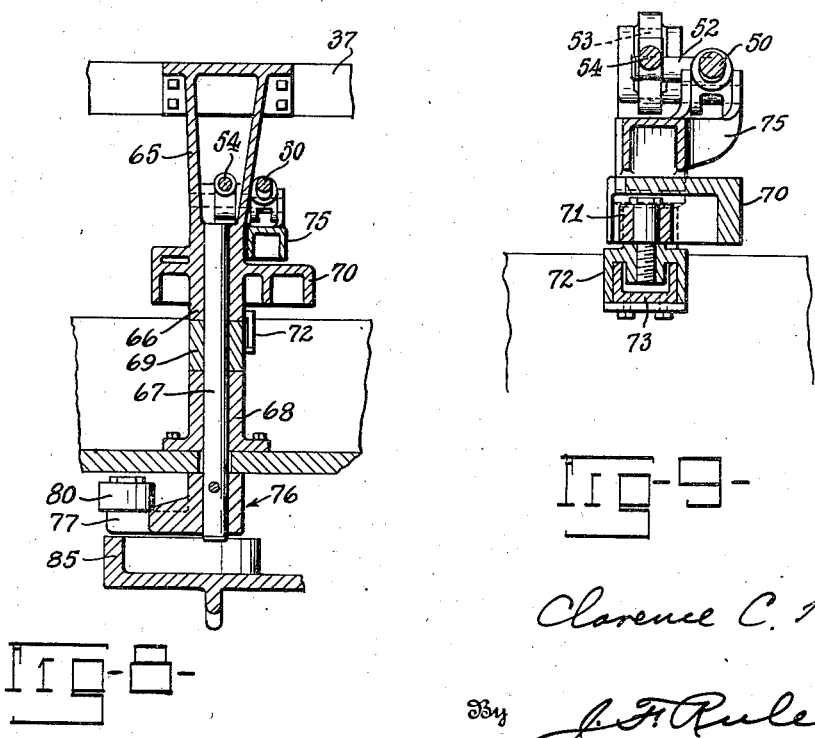

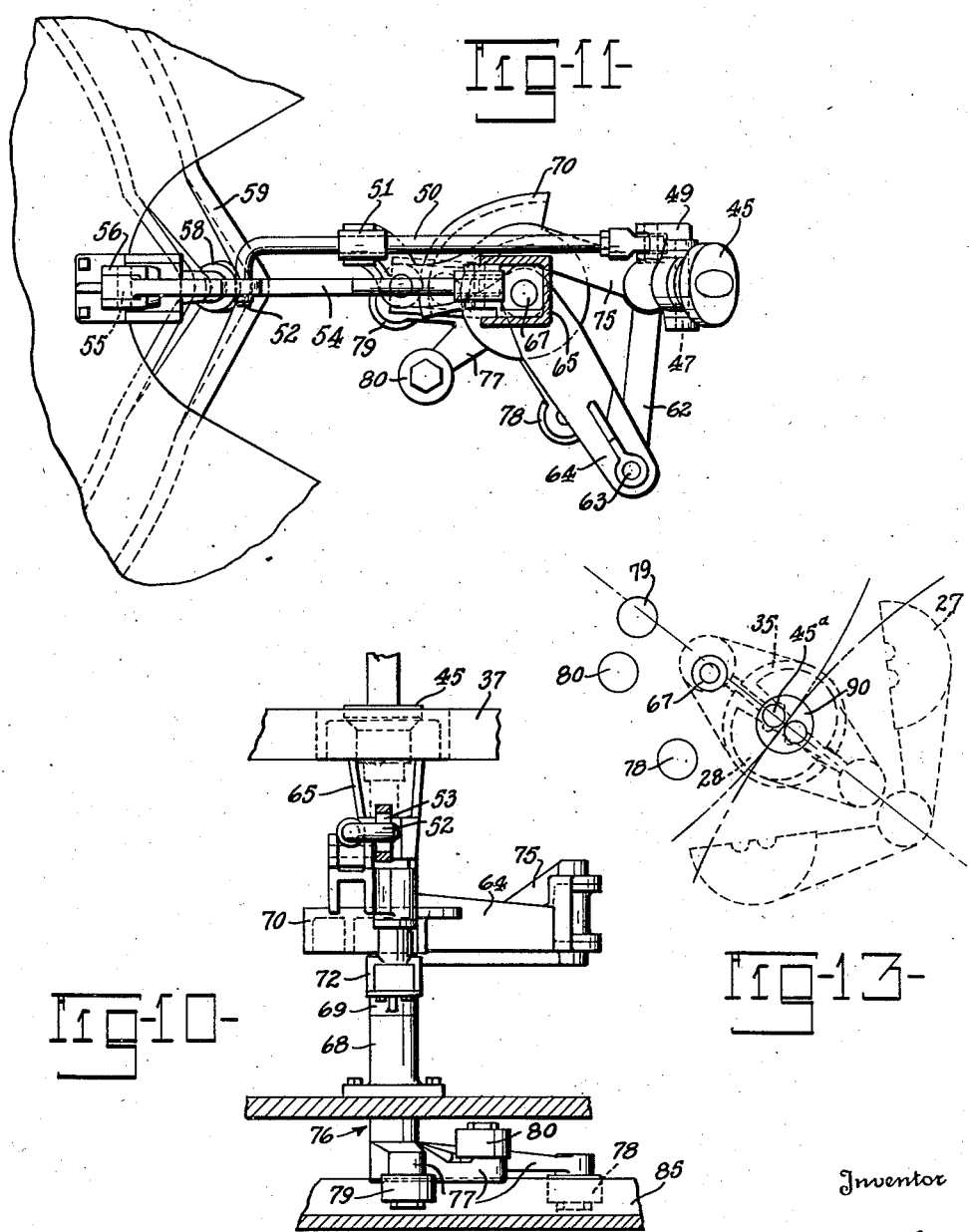

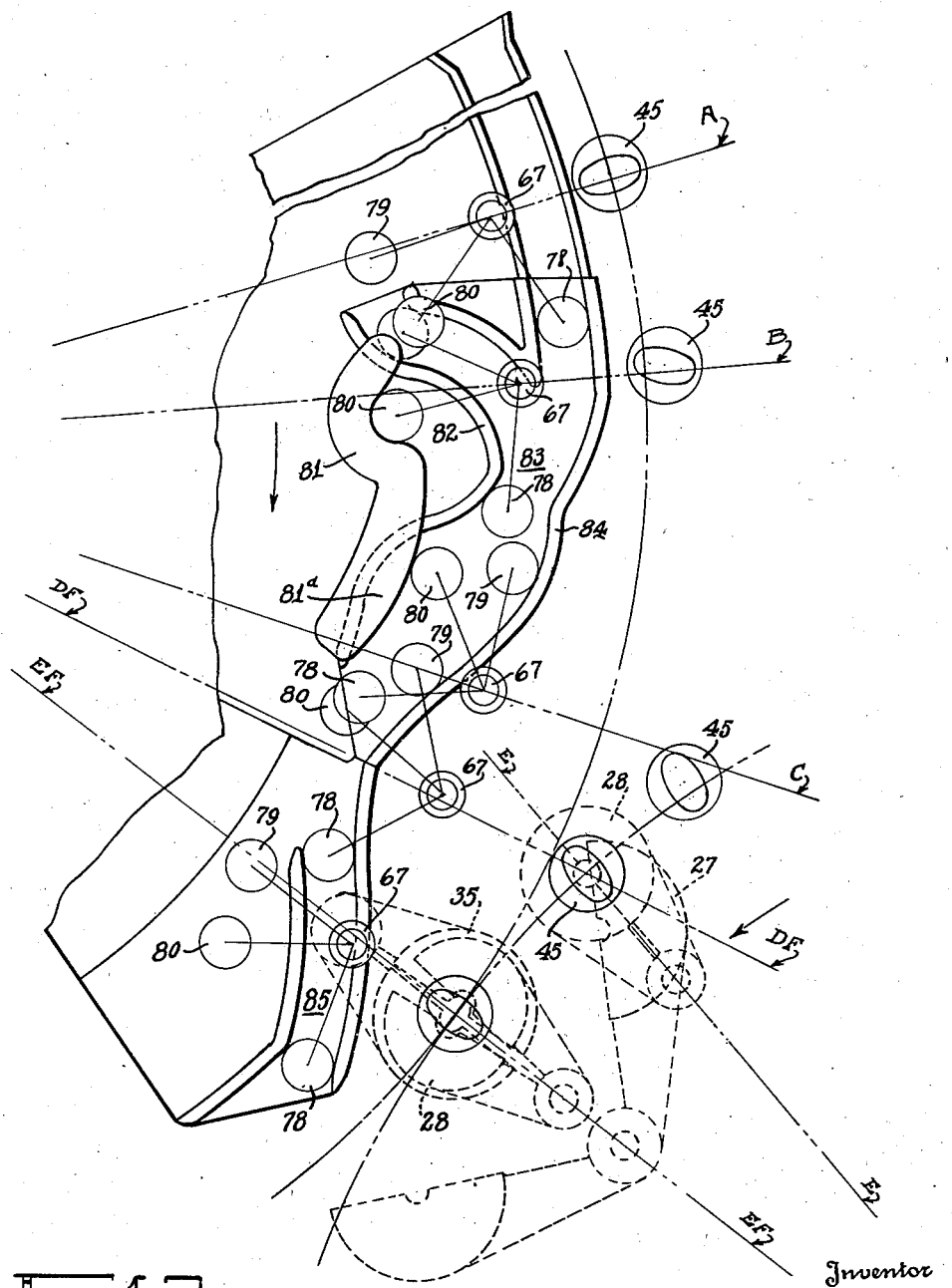

Patented June 1, 1937

2,082,640

UNITED STATES PATENT OFFICE 2,082,640

MACHINE FOR FORMING HOLLOW GLASS ARTICLES

Clarence C. Kinker, Alton, Ill., assignor to Owens-Illinois Glass Company, a corporation of Ohio Application April 15, 1935, Serial No. 16,304

11 Claims. (Cl. 49—9)

The present invention relates to improvements in machines for forming hollow glass articles and more particularly to two-table machines in which one table carries a series of blank or parison forming units and the other table carries a plurality of finishing mold units, the two tables being adapted for continuous rotation about separate vertical axes.

In machines of this character, the mold charges of molten glass are delivered to the blank forming units by a flow type feeder or by suction and transformed into blanks or parisons, which, in a transfer zone between the two tables, are transferred to the finishing mold units for final shaping.

While continuous rotation of the two tables is desirable for many obvious reasons, it has given rise to some difficulties as regards the transfer of blanks or parisons from one table to the other. Here it may be explained that the usual blank transferring operation involves opening the body blank mold in advance of arrival at the blank transferring zone so that the blank is suspended bare from the neck mold. The blank and neck molds are in many instances brought into vertical alignment at the entrance to the transfer zone and immediately thereafter a short puff of compressed air is introduced into the neck end of the blank for the purpose of forcing some of the hot glass from the center of the blank downwardly onto the bottom plate. This extremely hot glass spreads over the bottom plate to some extent and encloses and reheats the adjacent surface areas of the blank, with the result that the familiar cut-off scar is materially reduced if not entirely eliminated. Thereafter, the finishing mold closes about the blank and bottom plate and the neck mold opens, leaving the blank supported in its entirety by the finishing mold unit. The blank is then expanded to its final shape and at the proper time, removed from the finishing mold. Owing to the fact that, as stated above, the blank and finishing molds are rotated about separate vertical axes and the bottom end of the blank of necessity engages the finishing mold bottom plate prior to arrival at the center line extending between the vertical axes of the two tables, it will be apparent that the neck mold and bottom plate are subjected to a certain degree of rotary movement about their common vertical axis relative to each other and to the blank during the transferring operation.

As a result, the blank or parison is subjected to a twisting motion which to a considerable degree cracks or wrinkles the enamel coating, such distortion resulting in the production of defective glassware.

Another objection is that the mold seams which extend lengthwise of the blank and result from inaccurate alignment of the blank mold halves or separation thereof during the blank forming operation, ordinarily do not register with the parting line of the finishing mold. This results in the creation of additional seams or ridges which, except for the improper location of the blank in the finishing mold, would not be created. It is obvious, in view of the above, that the objectionable conditions are further complicated where the machine is operating with double cavity molds.

An object of the present invention is to overcome the above objections by bringing the finishing mold bottom plate into supporting engagement with the bottom end of the blank and so moving the latter that the mold seams on the parison are maintained in such position relative to the finishing mold that when the latter closes about the blank, the mold parting line will register with the mold seams on the blank.

Another object of the invention is the provision of novel means for projecting the finishing mold bottom plate radially outward into register with a blank suspended from a neck mold on another table and shortening the radius of the bottom plate circle and imparting rotary movement to the bottom plate about its vertical axis as it approaches the center line extending between the axes of the two tables.

A further object of the invention is the provision of novel mechanism for tilting the finishing mold bottom plate for the purpose of discharging the finished articles.

Other objects will be in part apparent and in part pointed out hereinafter.

In the drawings:

Fig. 1 is a vertical sectional view with parts in elevation illustrating the present invention embodied in the well known O'Neill type machine.

Fig. 2 is a fragmentary plan view thereof.

Fig. 3 is a diagrammatic plan view of the finishing mold bottom plate and neck mold in register with each other in advance of arrival at the transfer zone.

Fig. 4 is a view similar to Fig. 3, illustrating another position of the finishing mold bottom plate and neck mold, in which the radius of the bottom plate circle has been shortened.

Fig. 5 is a view similar to Figs. 3 and 4 showing the molds in the transfer zone.

Fig. 6 is a fragmentary vertical sectional view with parts in elevation of the bottom plate operating mechanism.

Fig. 7 is a front elevational view of the bottom plate and its operating mechanism.

Fig. 8 is a vertical sectional elevational view taken along the line VIII—VIII of Fig. 5.

Fig. 9 is a sectional view taken along the line IX—IX of Fig. 5.

Fig. 10 is a sectional elevational view taken substantially along the line X—X of Fig. 5.

Fig. 11 is a sectional plan view of said bottom plate and its operating mechanism.

Fig. 12 is a diagrammatic plan view showing the cams for controlling the successive positions of the mold bottom plate and illustrating the relative positions of the cam rolls at various points in proximity to and in advance of the blank transferring zone.

Fig. 13 is a diagrammatic view illustrating several successive positions of double cavity molds in and in proximity to the blank transferring zone.

In more or less general terms, the present invention which is of particular importance in connection with two-table bottle forming machines, consists of means for imparting radial outward movement to the finishing mold bottom plates into vertical alignment with blanks or parisons and neck molds or other supporting means in advance of arrival at the blank transferring zone. Moreover, the invention provides for movement of the bottom plates about their individual vertical axes in such fashion that, as they approach, enter, and travel through the transferring zone, their angular position with respect to the corresponding neck molds or other blank supports, does not change. Thus, the blanks or parisons which ordinarily are elongated and brought into contact with the mold bottom plates prior to the transferring operation, will not be subjected to any twisting motion which would distort them and result in the production of defective and unmarketable ware.

The invention is illustrated as embodied in a bottle machine of the well known O'Neill type, which machine includes a blank mold table 20 and a finishing mold table 21 arranged side by side and adapted for continuous rotation about separate vertical axes. The finishing mold table 21 rotates about a stationary central column 22 rising from a base 23 and the blank mold table 20 rotates about a vertical column 20ª. These tables include meshing ring gears 24, which may be rotated by any conventional or preferred form of driving mechanism.

The blank mold table includes a rotary carriage 25 supporting a blank forming unit 26 which is of well known construction and includes a partible blank mold 27, neck mold 28 and plunger unit 29. A vacuum pipe 30 and supply pipe 31 for air under pressure, are suitably connected to the plunger unit 29 and through this unit to the blank and neck molds 27 and 28. Details of this particular construction, which is of well known form, will be understood by reference to my Patent #1,980,343 issued November 13th, 1934. The neck mold 28 is adapted to be opened in the manner shown in said patent, the mechanism including a pivoted lever 32 adapted to be moved downwardly into operative position by means of a stationary cam 33. A closure plate 34 or baffle plate is adapted to be placed beneath and close the charging opening of the blank mold 27 following the customary charging and severing operations. Upon completion of the charging and blank forming operations, the blank is transferred to a finishing mold 35. This finishing mold includes two sections pivoted to a vertical hinge pin 36 which is mounted upon a mold carriage 37 constituting part of the finishing mold table 21. This mold is adapted to be opened and closed periodically by means of a stationary horizontal cam 38, the latter operating conventional toggle and link mechanism 39 which is connected to arms 40. These arms directly support the mold sections. A blow-head unit 41 is mounted upon the mold carriage 37 and adapted to be placed in operative position over the finishing mold at regular time intervals by mechanism 42 intended to be actuated by a stationary cam 43. All of the mechanism above described in more or less general terms, is of conventional form and may be further understood if desired, by reference to the patent identified above.

Each bottom plate unit 44 which completes the finishing mold group, includes a bottom plate 45 and a bottom plate holder 46, the latter pivoted upon a horizontal hinge pin 47 at the upper end of a vertically adjustable post 48. This holder is suitably connected through a lever 49 to a rod 50 which normally extends radially inward toward the axis of the finishing mold table, said rod having its inner end slidingly supported in a guide 51 and the extreme inner end of said rod having a lateral finger 52 thereon which normally projects into a lateral opening 53 in a link 54. This link 54 is pivoted at its inner end by means of a horizontal hinge pin 55 to the upper end of a lever 56, the latter in turn being pivoted to a hinge pin 57 and carrying a cam roll 58 at its lower end. A cam 59 operates through said cam roll 58 and the levers and rods just described to tilt the bottom plate 45 at regular time intervals. It will be noted that this bottom plate does not merely drop away from beneath the bottle 60 during the discharging operation, but instead, tends to initially throw the bottle outwardly and upwardly substantially in the direction of its length, thereby avoiding or at least materially reducing the tendency of the bottle to slide over the bottom plate and distort lettering or other marking on the bottom of the bottle.

As has been brought out heretofore, it is customary and in fact of considerable advantage to elongate the blank and thereby bring some of the hot central portions of the glass into contact with the bottom plate and marginal areas of the bottom end of the blank for the purpose of removing or materially reducing the cut-off scar, such elongation being effected by the introduction of air under pressure through the neck mold and into the neck end of the blank just prior to arrival of the blank at the entrance to the transfer zone. With the blank supported by the neck mold or other device on the blank mold carriage and the bottom end of the blank more or less firmly engaged with the bottom plate of the finishing mold, together with the rotation of these elements about different centers, it is evident that ordinarily the blank would be subjected to a twisting motion about its longitudinal axis which would seriously and detrimentally affect the quality of the finished article. To avoid this, I have provided means for imparting rotary motion to the finishing mold bottom plate about its own vertical axis and radial movement thereof on the mold table so that relative movement between the bottom plate and corresponding neck mold or other blank support, is avoided from the time the blank is brought into engagement with the bottom plate until the neck mold or other blank support has been disengaged therefrom. The mechanism for accomplishing this may be as follows:

The post 48 which supports the bottom plate holder, is threaded into a sleeve 61 which is provided at the outer end of a horizontal arm 62, the latter being pivoted to a vertical hinge pin 63 at the outer end of a bracket 64. This bracket may well constitute an integral part of a casting 65 which is bolted or otherwise attached to a part of the finishing mold table 37, said casting including a vertical bearing 66 in which the upper portion of a shaft 67 is journaled, the lower portion of the latter being journaled in a bearing 68 and connected to operating mechanism as will be pointed out hereinafter. Between the bearings 66 and 68 is a collar 69 which is keyed to the shaft 67 for reasons which will be apparent presently. A downwardly facing box cam 70 is formed integral with the casting 65 (Figs. 5, 6 and 8), said cam extending slightly more than 90° about the upper bearing 66 and operating to direct the path of movement of a roller 71 which is carried by a slide block 72. This slide block is supported on a guide member extending radially and horizontally from the collar 69, connected at its outer end through a vertical pin 74 to one end of a connector bar 75, the other end of which is secured to the sleeve 61 in which the post 48 is threaded. Incidentally this connector bar 75, carries the guide 51 referred to heretofore as supporting the inner end of the rod 50 which constitutes part of the bottom plate tilting mechanism. The cam is of such shape that upon imparting rotary movement to the shaft 67 in a clockwise direction from the position shown in Fig. 5 for example, the bottom plate 45 will move radially outward and simultaneously move about its own vertical axis.

At the lower end of the shaft 67 there is provided a spider 76, including three radial arms 77, one carrying a roller 78, another a roller 79 and the third a roller 80, which are intended for engagement in a predetermined order with stationary cams disposed about the axis of the finishing mold table.

In operation, the two mold tables are rotated continuously in opposite directions so that the adjacent sides move in substantially the same direction. Shortly in advance of arrival at the blank transferring zone, which is disposed between the two tables, the body blank mold 27 is opened, leaving a bare blank suspended from the neck mold as is customary. At a point approximately 45° in advance of the transferring zone, the roller 80 is brought into engagement with a stationary cam 81 which operates to rotate the shaft 67 in a clockwise direction and thereby swing the arm 62 in a clockwise direction about its hinge pin 63. Thus, the bottom plate 45 is moved substantially radially outward on the finishing mold table and simultaneously therewith is rotated a few degrees about its own vertical axis due to the swinging movement of the connector bar 75 under influence of the arcuate cam 70. Incidentally, such rotary movement of the shaft 67 may be effected in part by movement of the roller 79 in contact with the inner wall 82 of a stationary box cam 83. Normally the bottom plate 45, shaft 67 and said rollers 78, 79 and 80 occupy substantially the relative positions indicated at line "A" Fig. 12. Substantially at line "B" the bottom plate 45 and other elements just referred to, will assume the positions shown, wherein the bottom plate has moved radially outward a short distance and rotated a few degrees about its own vertical axis. Later, substantially at line "C", the bottom plate will have been completely projected and rotated to the maximum degree due to the roller 80 riding over an extension 81ᵃ of the cam 81. It will be observed here that the roller 79 is engaged with the outer wall 84 of the box cam 83. This serves to steady the mechanism and hold the shaft 67 against premature oscillation. Substantially at point "D" the bottom plate is vertically aligned with the blank or parison and the neck mold or other device from which the blank is supported. A puff of air under pressure is introduced into the upper end of the blank in the customary manner and as is usual, forces some of the hot glass through the lower end of the blank and into engagement with the bottom plate, this extruded glass tending to enclose and reheat and thereby to a very appreciable degree, remove the "cut-off scar". From this point, on to the center line extending between the axes of the two tables, the bottom plate is moved substantially radially inward relative to the finishing mold table and rotated slowly in a counter clockwise direction about its own axis. Such movement is so synchronized with movement of the blank and neck mold that there is no relative rotary movement between the bottom plate, blank and neck mold. Consequently the blank is not subjected to any twisting motion about its longitudinal axis. Moreover, the seam produced on the blank by the blank mold is held in such position that it will accurately register with the parting line of the finishing mold when the latter closes at the blank transferring position. Such counter clockwise movement of the bottom plate and radial inward movement of the latter is obtained by travel of the cam roll 78 through the box cam 85.

In this transferring zone, the finishing mold quickly closes about the blank and the neck mold opens, leaving the blank enclosed in and supported by the finishing mold. Air under pressure is then introduced into the upper end of the blank for the purpose of expanding the latter to its final shape.

In Figs. 3, 4, and 5 I have shown several successive positions of the bottom plate 45. In Fig. 3 the plate is shown projected approximately 20° in advance of the actual blank transferring position. In this figure, line E—E represents a radial line extending through the neck mold and bottom plate and the line F—F, a radial line extending from the axis of the finishing mold table through the bottom plate. In Fig. 4, the molds have moved a short distance towards the transferring zone and as will be observed, the bottom plate has rotated a short distance in a counter clockwise direction and is somewhat nearer the shaft 67. In Fig. 5 the axes of the bottom plate, neck mold and blank are in register with the center line extending between the axes of the blank and finishing mold tables.

It will be observed that the rod 50 constituting part of the bottom plate tilting mechanism, is separated from the bar 54 from the time the bottom plate is moved to its outermost position until it has resumed its normal position. The finger 52 at the inner end of said rod, and the opening 53 in said bar, provide for such separable connection between these two elements.

In Fig. 13 is illustrated, the manner in which the present invention affects double cavity mold operations. The two bottom plates 45ª are mounted upon a holder 90, which at its center, is intended to be connected to an adjustable post such as the post 48 on which the bottom plate holder 46 is mounted. By moving the bottom plate holder 90 in the same manner as the holder 46, described heretofore, the two bottom plates may be maintained in proper position relative to a pair of blanks and neck molds for a predetermined period prior to and during the blank transferring operation.

Modifications may be resorted to within the spirit and scope of the appended claims.

I claim:

1. A glassware forming machine including blank and finishing mold tables arranged side by side for continual rotation about separate vertical axes, mold groups on the blank mold table continually rotating therewith, each mold group including partible cooperating body blank and neck molds, mold groups on the finishing mold table, each group including a partible finishing mold and a mold bottom plate, means for imparting continuous rotary movement to the tables and said molds whereby the molds are brought in succession to a blank transferring position between said tables, means for opening each body blank mold in advance of the blank transferring position and thereby suspending a bare blank from the neck mold, means for projecting the corresponding mold bottom plate radially outward into supporting engagement with the lower end of the blank in advance of said transferring position, means for closing the corresponding finishing mold about the blank at said transferring position, means for expanding the blank in the finishing mold, and means for moving the mold bottom plate about its own vertical axis as it approaches the blank transferring position to eliminate relative rotation between the mold bottom plate and said neck mold during said period.

2. In a glassware forming machine, blank and finishing mold tables arranged side by side and continually rotatable about separate vertical axes, a blank forming unit on said blank mold table including partible body blank and neck molds, a finishing mold group on the finishing mold table including a partible finishing mold and a mold bottom plate, means for imparting continuous rotary movement to the tables and said molds and thereby bringing the mold groups to a blank transferring position between said tables, means for opening the body blank mold in advance of the transferring position and thereby suspending a bare parison from the neck mold, mechanism for projecting the mold bottom plate radially outward into supporting engagement with the lower end of the parison and causing said bottom plate to move in a path coincident with that traveled by the bare blank and neck mold to said transferring position, means for moving the mold bottom plate about its vertical axis during travel thereof with the blank to said transferring position to thereby prevent twisting of the blank about its axis relative to the neck mold, means for closing the finishing mold about the blank and means for expanding the blank in said mold.

3. In a glassware forming machine, blank and finishing mold tables arranged side by side and rotatable about separate vertical axes, a blank forming unit on said blank mold table including partible body blank and neck molds, a finishing mold group on the finishing mold table including a partible finishing mold and a mold bottom plate, means for imparting continuous rotary movement to the tables and said molds and thereby bringing the mold groups to a blank transferring position between said tables, means for opening the body blank mold in advance of the transferring position and thereby suspending a bare parison from the neck mold, mechanism for projecting the mold bottom plate radially outward into supporting engagement with the lower end of the parison and causing said bottom plate to move in a path coincident with that traveled by the bare blank and neck mold to said transferring position, means for moving the mold bottom plate about its own vertical axis during travel thereof with the blank to said transferring position to thereby prevent twisting of the blank about its axis relative to the neck mold, means for closing the finishing mold about the blank, and means for expanding the blank in said mold.

4. In combination, a rotary mold carriage, means for continually rotating it, a finishing mold unit continually rotating therewith mounted upon the carriage and including a partible finishing mold, a bottom plate, a holder for the bottom plate, means for moving the holder substantially radially of the carriage relative to the finishing mold and means for imparting rotary movement to the bottom plate about its own vertical axis during radial movement thereof, in a direction opposite the rotation of said rotary mold carriage.

5. In combination, a rotary mold carriage, means for continually rotating it, a finishing mold unit continually rotating therewith mounted upon the carriage and including a partible finishing mold, a bottom plate, a holder for the bottom plate, means operated automatically by rotation of the carriage for moving the holder substantially radially of the carriage relative to the finishing mold and means for imparting rotary movement to the bottom plate about its own vertical axis during radial movement thereof, in a direction opposite the rotation of said rotary mold carriage.

6. In combination, a rotary mold carriage, means for rotating it, a finishing mold unit mounted upon the carriage and including a partible finishing mold, a bottom plate, a holder for the bottom plate, a pivoted arm supporting the holder and mounted for oscillation about a vertical axis to thereby move the holder and bottom plate substantially radially of the mold carriage and cam controlled means for imparting rotary movement to the bottom plate about its own axis during swinging movement of said arm.

7. In combination, a rotary mold carriage, means for rotating it, a finishing mold unit mounted upon the carriage and including a partible finishing mold, a bottom plate, a holder for the bottom plate, a pivoted arm supporting the holder and mounted for oscillation about a vertical axis to thereby move the holder and bottom plate substantially radially of the mold carriage and cam controlled means for imparting rotary movement to the bottom plate about its own axis during swinging of said arm, said last named means including an arcuate stationary cam, a cam roll engaged therewith, a connector bar between said cam roll and bottom plate holder and means for moving the cam roll back and forth in said cam.

8. In combination, a rotary mold carriage, means for rotating it continuously about a vertical axis, a finishing mold unit thereon including a partible finishing mold and a bottom plate, a tiltable holder for the bottom plate, mechanism for tilting said holder at regular time intervals, means for moving the holder substantially radially outward on the mold carriage and means for imparting rotary movement to the holder about its own vertical axis during radial movement thereof, said means for imparting rotary movement to the holder including a substantially arcuate cam individual to the finishing mold unit, a cam roll engaged therewith, a connector between the cam roll and holder and means for effecting relative movement between the cam roll and cam.

9. In combination, a rotary mold carriage, means for rotating it continuously about a vertical axis, a finishing mold unit thereon including a partible finishing mold and a bottom plate, a holder for the bottom plate, a support at one side of the mold, a bracket extending horizontally therefrom, a horizontal arm pivoted at one end to said bracket and having supporting engagement at its other end with said holder, an arcuate cam carried by said support, a cam roll running in said cam, a connector bar between the cam roll and outer end of said arm and means for moving the roll in said cam, including a slide block carrying the cam roll, vertical shaft connected to the slide block, said shaft journaled in the bracket support, a plurality of arms radiating from the lower end of the shaft, cam rolls on said arms and stationary cams arranged about the axis of rotation of the mold carriage and operating through said arms to oscillate the shaft.

10. In a glassware forming machine, blank and finishing mold tables arranged side by side and rotatable about separate vertical axes, blank mold groups on said blank mold table, each including partible body blank and neck molds, finishing mold groups on the finishing mold table, each including a partible finishing mold and a mold bottom plate, means for imparting continuous rotary movement to the tables and thereby bringing the mold groups in succession to a position at which the neck mold and the bottom plate are in register with each other and thereafter advancing said registered neck mold and bottom plate through a path of travel to a transferring position, means for opening the body blank mold in advance of said path of travel and thereby suspending a bare parison from the neck mold, mechanism for maintaining the bottom plate and the neck mold relatively stationary during the period of said travel to thereby prevent relative rotation of the parison in the neck mold and the bottom plate, said mechanism including means for rotating the bottom plate about its own vertical axis in a direction opposite to the direcion of rotation of the said finishing mold table, means for closing the finishing mold about the blank, and means for expanding the blank in said mold.

11. In a glassware forming machine, blank and finishing mold tables arranged side by side and rotatable about separate vertical axes, blank mold groups on said blank mold table, each including partible body blank and neck molds, finishing mold groups on the finishing mold table, each including a partible finishing mold and a mold bottom plate, means for imparting continuous rotary movement to the tables and thereby bringing the mold groups in succession to a position at which the neck mold and the bottom plate are in register with each other and thereafter advancing said registered neck mold and bottom plate through a path of travel to a transferring position, means for opening the body blank mold in advance of said path of travel and thereby suspending a bare parison from the neck mold, mechanism for maintaining the bottom plate and the neck mold relatively stationary during the period of said travel to thereby prevent relative rotation of the parison in the neck mold and the bottom plate, said mechanism including means for moving said bottom plate radially outward from said finishing mold table to move it in a circumferential path coincident with that traveled by the neck mold and including means for rotating said bottom plate about its own vertical axis in a direction opposite to the direction of rotation of said finishing mold, means for closing the finishing mold about the blank, and means for expanding the blank in said mold.

CLARENCE C. KINKER.